(12) United States Patent
McGrath

(10) Patent No.: US 6,772,529 B1
(45) Date of Patent: Aug. 10, 2004

(54) CONTACT COMPARATOR AND METHOD OF OPERATION

(75) Inventor: Gerald J. McGrath, Garden Grove, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 290 days.

(21) Appl. No.: 09/907,879

(22) Filed: Jul. 18, 2001

Related U.S. Application Data

(63) Continuation-in-part of application No. 09/437,727, filed on Nov. 10, 1999, now abandoned.

(51) Int. Cl.[7] .................................................. G01B 5/20
(52) U.S. Cl. ........................................... 33/556; 33/551
(58) Field of Search ........................... 33/556, 557, 503, 33/504, 549, 551, 552, 553, 554, 555, 642, 545, 546

(56) References Cited

U.S. PATENT DOCUMENTS

| | | | | |
|---|---|---|---|---|
| 2,825,140 A | * | 3/1958 | Musser et al. ................. 33/555 |
| 3,226,837 A | * | 1/1966 | Wilkie et al. .................. 33/545 |
| 4,680,865 A | * | 7/1987 | Danielli et al. ............ 33/501.6 |
| 5,097,602 A | * | 3/1992 | Cross et al. ................... 33/551 |
| 5,257,460 A | * | 11/1993 | McMurtry .................... 33/502 |
| 6,314,655 B1 | * | 11/2001 | Quintavalla et al. ........ 33/555.1 |
| 6,401,349 B1 | * | 6/2002 | Onyon ......................... 33/551 |

* cited by examiner

*Primary Examiner*—Christopher W. Fulton
(74) *Attorney, Agent, or Firm*—Mark Homer

(57) ABSTRACT

An automated contact gage system for gaging a workpiece or device has a left spindle, a right spindle and a stylus arm for contacting the workpiece or device in the same Y plane as the probe. A bearing arrangement is used to contact the stylus arm so as to guide and support the stylus arm during contact gaging of the device. The bearing arrangement comprises a spherical race, derived from three spherical elements, contacting a bearing so as to provide for multi-dimensional movement and measurement of movement of the stylus arm. First, and second sensors sense and measure movement of the stylus arm and/or workpiece in two dimensions, while a third sensor senses and measures rotation of the workpiece by the right spindle.

24 Claims, 3 Drawing Sheets

CONTACT COMPARATOR AND METHOD OF OPERATION

CROSS REFERENCE TO RELATED APPLICATIONS

This application is a continuation-in-part of U.S. patent application Ser. No. 09/437,727 filed on Nov. 10, 1999 now abandoned.

STATEMENT OF GOVERNMENT INTEREST

The invention described herein may be manufactured and used by or for the Government of the United States of America for government purposes without the payment of any royalties therefor.

REFERENCE TO COMPUTER PROGRAM LISTING APPENDIX

A Computer Program Listing Appendix is hereby expressly incorporated by reference. The Computer Program Listing Appendix includes two duplicate compact discs. The files on each compact disc, their size in bytes, and the date created are:

| File Name | Size | Date Created |
| --- | --- | --- |
| TG82.PRG | 324,990 | Feb. 13, 2001 |

BACKGROUND OF THE INVENTION

1. Technical Field

The present invention generally relates to an automated contact gage system using a three-axis contact contour comparator. More particularly, the invention relates to an automated contact gage system which employs a multiform contour scanner comparator which is capable of calibrating a wide range of dimensional forms/artifacts. The gage system can be employed for thread characterization (measurement), but is also capable of measuring high grade angle blocks, gage blocks, rolls, spherical forms, and virtually all manner of dimensional forms.

2. Related Art

Every fastening device owes its reliability and worth to its inherent dimensional properties. Dimensional properties can critically affect alignment properties which, in the case of certain machines or devices, can affect dynamic stability and even cause damage to or destroy the device or machine. Strength of the fastening device and the joinder accomplished by the device are important, but load distribution is also an important factor.

In the case of joinders by thread-type devices, the dimensions are embraced in the thread features which, in turn, are integral to the host cylinder. Load distribution, strength, functionality and reliability are all dependent on the dimensional properties. For example, too much load on a particular thread due to (for example) a deformed thread/cylinder can lead to shearing of that thread with obvious, detrimental consequences.

Threads are difficult to gage at the point where it counts (such as where a male device contacts a female device), so that wires have been used to make contact with both the right part of the thread and the gaging anvils. This is generally satisfactory, but it is costly and slow, making large samples impractical. Nevertheless, two or three points around the perimeter on the threads does not tell you much about the plug or the ring on which the threads are located. In addition, it tells you nothing about the load distribution properties of the device. For a comprehensive characterization of a fastener, one needs a robotized contour scanner that can gather and analyze large quantities of data in an unattended manner. With the infinitely fuller characterization afforded by a robotized scanner, one can begin to understand the fastener in question.

Although thread parameters are usually divided into major diameter, minor diameter, pitch diameter, lead, helical path, lead angle and taper, everything in between (which amounts to roundness and taper) is also important This is due to the fact that any deformation of the fastener can cause barrier thereof. Thus, the current generation of gages does not begin to meet the challenges associated with the development of modem fastening devices.

The following patents are considered to be representative of the prior art relative to the subject invention, but are burdened by various disadvantages discussed herein: U.S. Pat. No. 4,153,998 to McMurtry, entitled PROBES, issued on May 15, 1979, U.S. Pat. No. 5,822,877 to Dai, entitled MULTI-PROBE SYSTEM FOR DIMENSIONAL METROLOGY, issued on Oct. 20, 1998, U.S. Pat. No. 4,317,644 to Hosoi, entitled MACHINE TOOL PROFILING DEVICE, issued on Mar. 2, 1982, U.S. Pat. No. 4,785,545 to Aubele, entitled MEANS FOR SIMULTANEOUSLY CONNECTING A PLURALITY OF SWITCH-TYPE PROBE HEADS TO THE MEASUREMENT ARM OF A COORDINATE-MEASURING MACHINE, issued on Nov. 22, 1988, U.S. Pat. No. 5,917,181 to Yoshizumi et al., entitled PROFILE MEASURING APPARATUS, issued on Jun. 29, 1999, and U.S. Pat. No. 5,659,969 to Butler et al., entitled POSITION DETERMINING PROBE, issued on Aug. 26, 1997.

In particular, McMurtry, '998 discloses a probe for determining at what point in space contact is made between an object and a stylus. It should be noted that, in FIG. 3 of the patent, dual bearings 9 and 10 along with an element 4 making up the probe 1 are disclosed. Similarly, Dai '877 discloses a multi-probe system for dimensional metrology in which two ball bearings 516 and 518 and an element 502 which is spherically shaped and located adjacent to the bearings 516 and 518 are disclosed. The remaining patents disclose arrangements and features quite different from those disclosed and claimed herein. In short, none of these patents discloses an automated contact gage system employing a three-axis contact contour comparator, and capable of measurement in all three dimensions, as disclosed and claimed herein.

SUMMARY OF THE INVENTION

The present invention generally relates to an automated contact gage system using a three-axis contact contour comparator.

In general, the automated contact gage system of the present invention includes a left spindle and a right spindle connected by a spindle rail, the left spindle having a stylus arm mounted on a stylus arm vertical rail for contacting the workpiece to be gaged. The automated contact gage system also includes a control section for controlling movement of the various system elements in three different dimensions (X, Y and Z), the control system including a computer, printer and associated module, storage device, and X, Y and Z motor control units.

In further accordance with the invention, the movement of the stylus arm is controlled by a three-axis contact contour comparator arrangement including a bearing arrangement for contacting the stylus arm so as to guide and support it during contact with the workpiece or device being gaged. In a preferred embodiment, the bearing arrangement includes a spherical race and bearing, the spherical race preferably comprising five spherical elements or precision balls.

The automated contact gage system of the invention is unique in that it operates in accordance with three degrees of motion along X, Y and Z axes, respectively. Each axis has its own measurement sensor, which is, preferably, a fringe interferometer/scale line hybrid device. As will be apparent from the detailed description below, the system is completely automated, and no operator intervention is necessary once the device or workpiece to be gaged is mounted on the system for calibration.

Additionally, the hardware design of the automated contact gage system of the present invention is unique relative to arrangements of the prior art and other contemporary systems in that "hard" real-environment engagement with the surface (either inner or outer) of the workpiece is achieved via a unique design of the stylus arm bearing arrangement.

In accordance with the invention, a single-element contact scanner collects virtually continuous, three-dimensional information relative to the surface of the workpiece. With the specimen mounted on the system, the stylus of the system guides the specimen into contact under selected pressure. The system of the invention is able to convert the derived three-dimensional information into test instrument (TI) dimensional characteristics with uncertainties below fifty micro-inches, and this capability results from the system's capability of self-calibrating its own measurement elements using simple, smooth, well-characterized cylinder gages.

Finally, whereas prior and current conventional contact gages are virtually incapable of measuring certain parameters, such as root width and minor diameters (particularly with respect to wind-like structures), the present invention makes it possible to measure its own stylus thickness in real time under stress caused by the test instrument itself.

As a result of the aforementioned advantages, the present invention represents significant improvements over other past and current conventional gages, such as the following: go/no-go 'feel' output gages; parameter specific single point gages; optical comparators; lead machines; helical path analyzers; bench micrometers; scan/contact gages with contact contour scanners; and dental plaster.

The automatic contact gage system of the present invention employs a multiform contour scanner comparator capable of calibrating a wide range of dimensional forms/artifact. The gage system of the invention is capable of not only thread characterization on measurement, but also measurement of high grade angle blocks, gage blocks, rolls, spherical forms, and virtually all manner of dimensional forms.

In accordance with the invention, the surface to be gaged is contacted by an interchangeable, multi-purpose probe tailored for the application. The contact probe design optimizes "hole" gaging or, on the other end of the spectrum, functions as a statistical or high point flat anvil. In either case, since the gage is preferably a comparator device, it does not require correction factors for individuals probes. This is in contrast to prior art arrangements wherein flat contact types of gages in at least one dimension are employed.

Inasmuch as the heart of any contact measurement system is its bearing, the present invention obtains high performance characteristics (+/−10 micro-inch) under ideal conditions as a result of the employment of a unique bearing arrangement comprising a precision spherical race and bearing combination. Preferably, the race comprises the intersection of three precision balls made to a preferable accuracy of +/−5 micro-inch. Such a bearing arrangement is not present in the prior art.

In a preferred embodiment of the invention, the workpiece or device to be gaged is coupled to the system in one of two ways: free form (V-block or platinum); or centers or reverse centers. Furthermore, in the invention, there are three axes (X, Y, Z) of measurement motion known to +/−10 micro-inches. Each axis is sensed by its own respective sensor to +/−10 micro-inches, and communicates to the system control (preferably, a personal computer) through standard bus interfaces known to those of skill in the art. Each axis is driven by its own programmable step motor having a speed which is made to vary with friction and gravitational load imparted to the probe. Due to the construction of the stylus form employed in the invention, the probe must be "pulled" flanks and "walked down" flanks. A unique orchestration of speed versus probe load allows the system of the invention to experience a resolution approaching the stated values in places of highest interest on the surface of the workpiece, and also speeds up the remainder of the characterization, thereby saving substantial operational time.

Finally, the gage is truly a three-dimensional gage since it never loses its original scan reference in the X, Y or Z axes. Therefore, separate scans can be united to obtain parameters, such as a helical path, previously obtainable only by separate, expensive and elaborate machines.

Therefore, it is an object of the present invention to provide an automated contact gage system using a three-axis contact contour comparator.

It is an additional object of the present invention to provide an automated contact gage system having a stylus arm which is guided and supported by a three-axis bearing arrangement.

It is an additional object of the present invention to provide an automated contact gage system comprising a left spindle, right spindle, stylus arm and three-axis bearing arrangement.

It is an additional object of the present invention to provide an automated contact gage system having a bearing arrangement which includes a spherical race and three spherical elements.

The above and other objects of the invention, and the nature of the invention, will be more clearly understood by reference to the following detailed description, the associated drawings, and the appended claims.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

Figure 1:
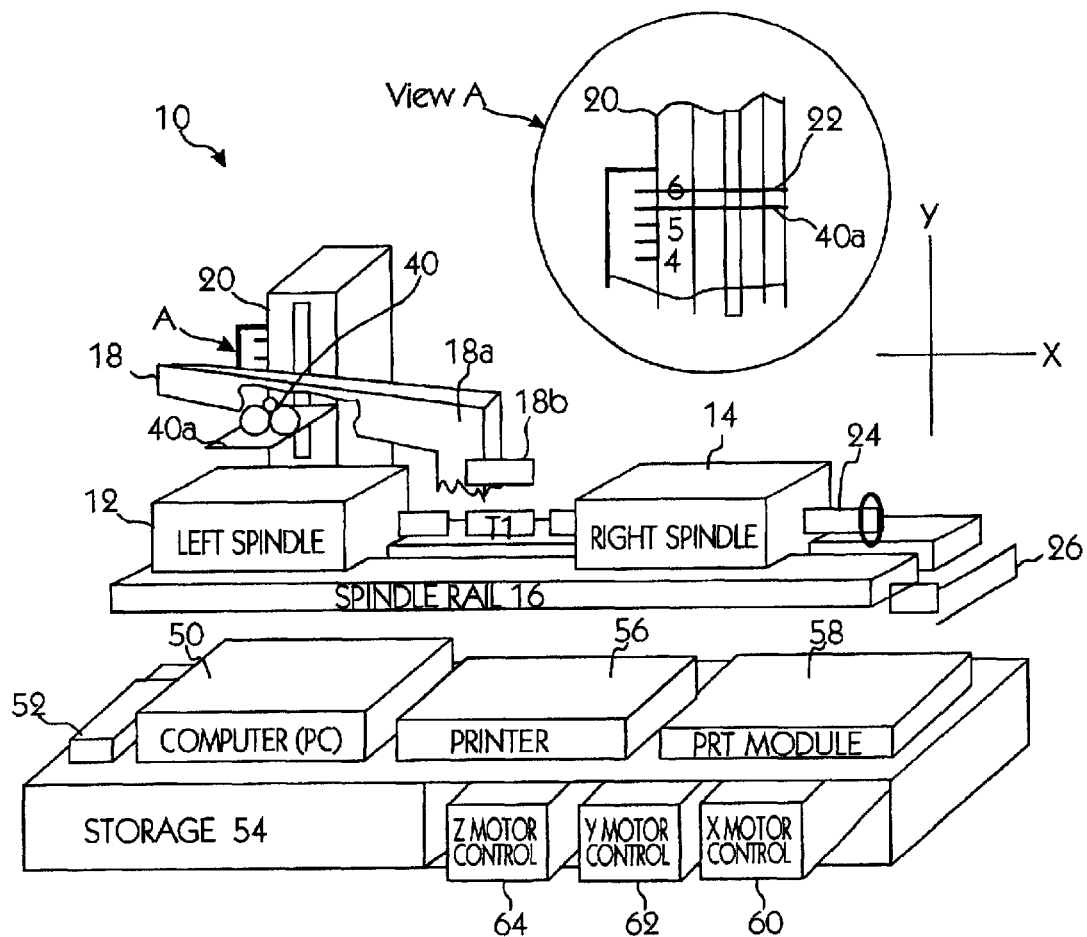
FIG. 1 is a system block diagram of an automated contact gage system in accordance with the invention.

The present invention will now be described in more detail with reference to the various figures of the drawings, in which FIG. 1 is a system block diagram of an automated contact gage system in accordance with the invention.

As seen in FIG. 1, the system 10 of the present invention comprises a left spindle 12 interconnected to a right spindle 14 by a spindle rail 16. A stylus arm 18 is mounted on a stylus arm vertical rail 20 via a bearing arrangement 40, the stylus arm 18 having a scanning arm 18a extending downwardly, and a stylus 18b extending horizontally from the scanning arm 18a. Right spindle 14 has an X spindle drive 24 mounted therein and driven by a motor 26.

The stylus arm vertical rail 20, as seen in more detailed view A in FIG. 1, has a vertical scale mounted vertically thereon, and has an index mechanism 22 which moves vertically in the Y direction as the stylus arm 18 is raised and lowered under the influence of Y motor control 62.

The control system of the automated contact gage system 10 comprises a computer (personal computer or PC) 50 having power supplied by a primary power module 52, and having associated therewith a storage device 54 and a printer 56 with associated printer module 58. The control system also includes X, Y and Z motor control units 60, 62, and 64, respectively, for controlling movement of the above-described mechanical elements with respect to X, Y and Z axes, respectively.

Figure 2:
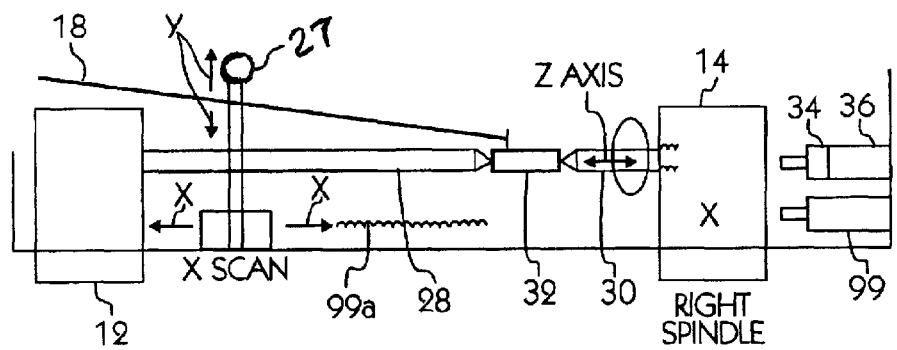
FIG. 2 is a mechanical system schematic of the system of FIG. 1.

FIG. 2 is a mechanical system schematic of the system of FIG. 1. Elements common to FIGS. 1 and 2 are identified by identical reference numerals.

As seen in FIG. 2, right spindle 14 has a rotatable protruding element 30 mounted therein, the element 30 being rotatable about the Z axis as shown in FIG. 2. Rotation of the element 30 is controlled by a Z-motor 34 under the influence of Z motor control 64 of FIG. 1. In addition, Z motor 34 has a Z sensor device 36 associated therewith for sensing the degree of rotation of the element 30.

As also seen in FIG. 2, movement of the stylus arm 18 in the X and Y directions is controlled by X and Y motor control units 60 and 62, respectively, shown in FIG. 1. For X movement, lead screw motor 99 connected to lead screw 99a is also provided.

In operation, a device or workpiece 32 to be gaged is held between the elements 28 and associated with left and right spindles 12 and 14, respectively. The stylus arm 18, supported and guided by the bearing arrangement 40, makes contact via its scanning arm 18a and stylus 18b with the workpiece 32 to be gaged. As mentioned above, the workpiece 32 can be a ring-like structure, a plug-type structure, or any other of a variety of workpieces which need to be gaged.

Furthermore, during the gaging process, the stylus 18b makes contact with the inner contour (in terms of an inner threaded ring-like structure) or the outer contour (in the case of a plug-type structure), varying in its movement in accordance with the threaded structure or other structure contacted. As the stylus 18b varies in its position in correspondence to the contour of the structure or workpiece 30 being contacted, the scanning arm 18a located between stylus arm 18 and stylus 18b also varies in position. Correspondingly, stylus arm 18 varies in position, and that variation in position is detected and sensed by a Y-axis sensor 39 (discussed below with reference to FIG. 5A). Movement of the stylus arm 18 in conjunction with left spindle 12 is detected by X-axis sensor 38 (also discussed below with reference to FIG. 5A). Finally, rotation of the element 30 and workpiece 32 about the Z axis is sensed by the Z-axis sensor 36 associated with Z-axis motor 34 (also discussed below with reference to FIG. 5A).

Figure 3A:
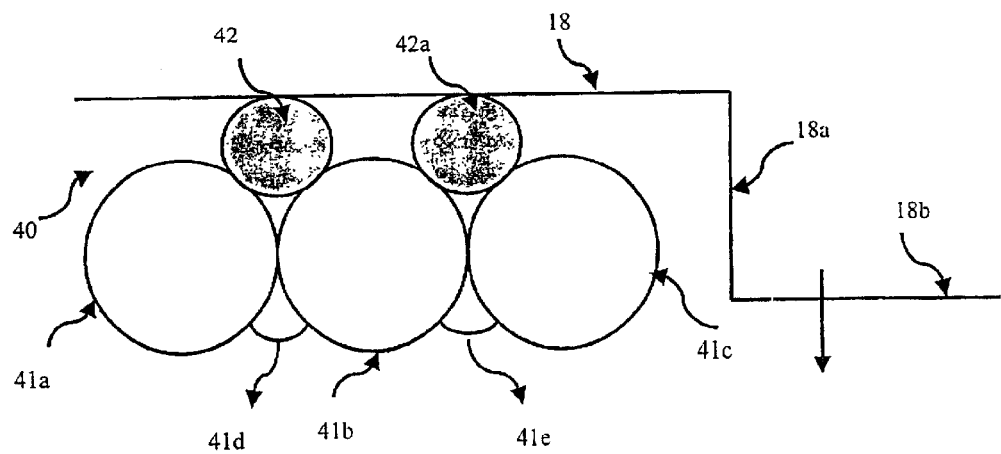
FIG. 3A is a side view of a bearing arrangement employed in the automated contact gage system of the present invention.
Figure 3B:
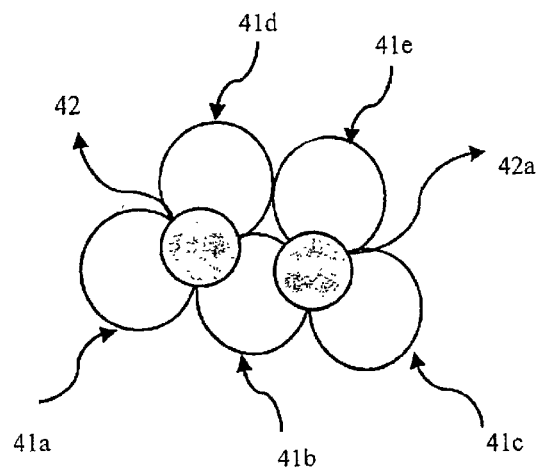
FIG. 3B is a top view of the bearing arrangement of FIG. 3A.

FIG. 3A is a side view of a bearing arrangement employed in the contact measurement system of the present invention, while FIG. 3B is a top view of the bearing arrangement of FIG. 3A.

As seen in FIGS. 3A and 3B the bearing arrangement 40 of the present invention comprises a spherical race including spherical elements 41a, 41b, 41c, 41d, and 41e being contacted by two bearings 42 and 42a. The stylus arm 18 rests upon the bearings 42 and 42a, while the bearings 42 and 42a are positioned on top of the spherical elements 41a, 41b, 41c, 41d and 41e. Thus, the bearing arrangement 40 provides for movement of the stylus arm 18 (with its scanning arm 18a and stylus 18b) in both the x and y directions within one plane only (along the plane of the paper in FIG. 3A and into the plane of the paper in FIG. 3B). As mentioned previously, with reference to FIGS. 1 and 2, the stylus 18 is enabled to move vertically (that is, parallel to the Y axis in FIG. 1) as a result of vertical movement of bearing arrangement 40 along the length of the stylus arm vertical rail 20. In the latter regard, further referring to FIG. 1, preferably, the bearing arrangement 40 is positioned or mounted on a horizontally disposed platform 40a, and the platform 40a is connected to the stylus arm vertical rail 20 for vertical movement. As also previously mentioned with reference to FIG. 1, an index 22 is provided on stylus arm vertical rail 20 so that, as the platform 40a moves vertically, a reading of its vertical position can be determined from the index 22. Therefore, due to the unique bearing arrangement of the present invention, the stylus 18 moves only in the x and y directions within a single plane so precise measurements can be taken in relation to the stylus 18 as it moves across the workpiece.

Figure 4A:
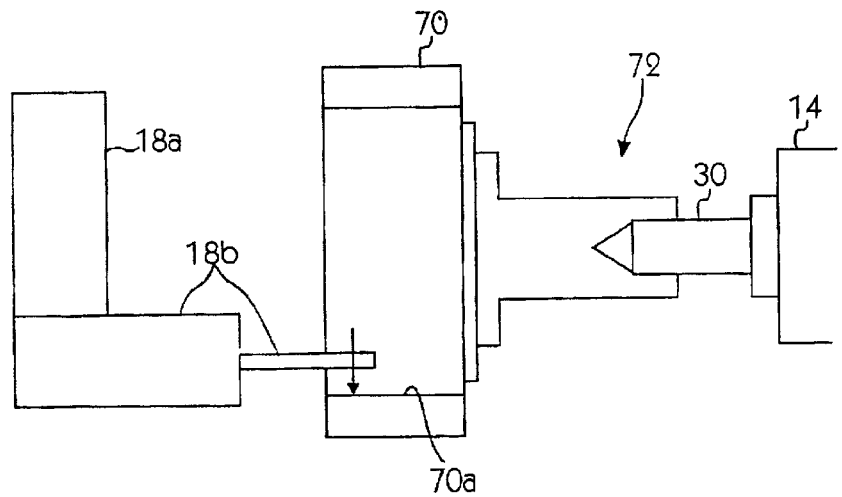
FIG. 4A is a diagrammatic representation of the use of the invention to gage a ring-like device.
Figure 4B:
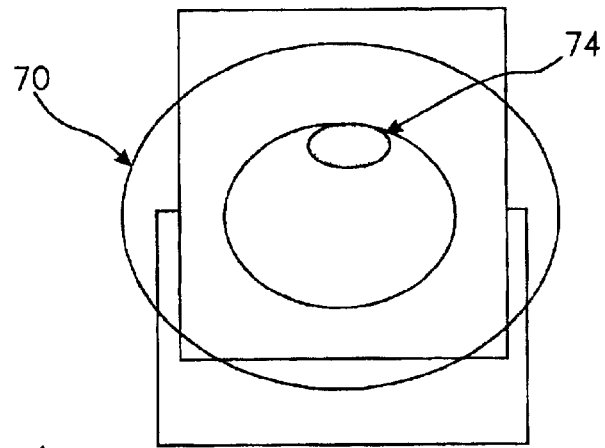
FIG. 4B is a side view of the representation of FIG. 4A.

FIG. 4A is a diagrammatic representation of the use of the invention to gage a ring-like device, while FIG. 4B is a side view of the representation of FIG. 4A.

Referring to FIGS. 4A and 4B, when it is desired to use the automated contact gage system for gaging of a ring-like structure 70, the ring-like structure 70 is mounted on a projecting portion 30 of the right spindle 14 by use of a ring adapter 72. As seen in FIG. 4B, a ring support pin 74 can be utilized in conjunction with the adapter 72 for supporting the ring-like structure 70.

Referring to FIGS. 1, 2, 4A and 4B, the Z motor control unit 74 can be utilized to rotate the projecting portion 30 of right spindle 14 and the ring-like structure 70 about the Z axis so that stylus 18b in contact with the inner threads or surface 70a of the ring-like structure 70 is able to measure the dimensions of the inner threads or surface 70a during such rotation.

Figure 5A:
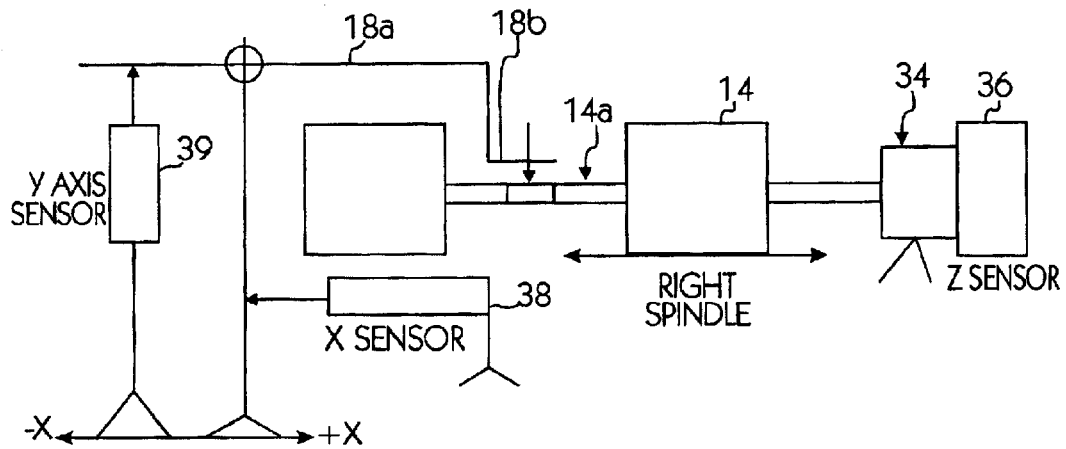
FIG. 5A is a functional system schematic of the invention depicted in FIG. 2.
Figure 5B:
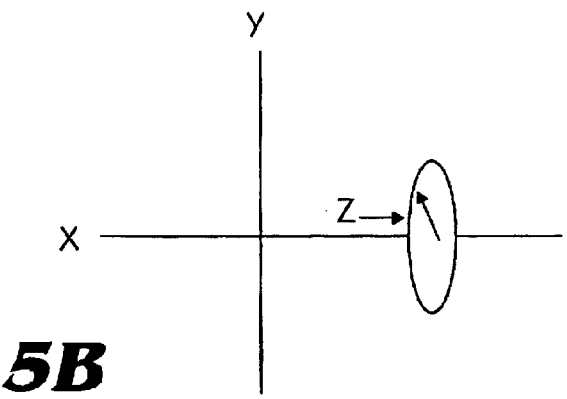
FIG. 5B is an orthogonal view of a portion of the functional system schematic of FIG. 5A.

FIG. 5A is a functional system schematic of the invention depicted in FIG. 2, while FIG. 5B is an orthogonal view of a portion of the functional system schematic of FIG. 5A.

As seen in FIGS. 5A and 5B, the automated contact gage system includes a Z motor 34 and Z sensor 36 associated with the right spindle 14, as well as an X sensor 38 and a Y sensor 39 associated with the scanning arm 18a of stylus arm 18. Thus, in the previously discussed example of gaging of the ring-like structure 70 of FIG. 4A, as the ring-like structure 70 connected via ring adapter 72 to the projecting portion 30 of right spindle 14 is rotated by Z motor 34 under the influence of Z motor control unit 64 (FIG. 1), Z sensor 36 detects and measures the amount of rotation of the ring-like structure 70. Furthermore, as the stylus 18b attached via scanning arm 18a to the stylus arm 18 moves as a result of the contact between stylus 18b and the inner threads 70a of the ring-like structure 70, X sensor 38 and Y sensor 39 detect and measure movement in the X and Y axis directions, respectively. The measurement values from X sensor 38, Y sensor 39 and Z sensor 36 are provided to the computer 50 (FIG. 1), wherein desired measurement data pertaining to the contour and dimensions of the inner surface (inner threads 70a) of structure 70 are developed for storage in storage unit 54 or print out via printer 56 driven by printer module 58. In another embodiment of the invention, which is not shown, the Z motor control unit 64 and Z sensor 36 can be connected to a projecting portion 30 placed upon the left spindle 12 in the same manner as it can be connected to the right spindle 14.

To summarize, as a result of the automated contact gage system using a three-axis contact contour comparator, various disadvantages of prior art arrangements are overcome. Specifically, the invention provides improved measurement technology in the area of dimensional standards for inner diameter and outer diameter characterization. Additionally, improved measurement technology for parameters associated with both external and internal taper is also provided. Thus, the invention overcomes the unsatisfactory measurement standards associated with art arrangements of the prior art.

In addition, the automated contact gage system of the present invention provides complete and full characterization or limited sampling in accordance with the desires of the user. This is in contrast to prior art arrangements, wherein dimensional artifact measurement is quite expensive, and wherein poor quality and very limited sampling arc experienced.

Furthermore, the automated contact gage system of the present invention operates in accordance with a technique and an operational procedure which results in reduced cost of calibration as a result of automation of various procedures previously performed in prior art arrangements by manual methods. Thus, a reduction in manual labor cost also results from implementation of the present invention.

As a result of the operation of the present invention, in contrast to prior art arrangements, up to fourteen test data parameters can be developed and printed out in four or more different formats, of which the first three formats are on a thread-by-thread basis, and the fourth is a total raw data printout. The parameters which can be developed and outputted by the present invention are the following: major diameter, minor diameter, flank angle, pitch diameter, lead, root width, root radii, taper, roundness, helical path, temperature, runout, crest width and stylus radius.

While preferred forms and arrangements have been shown in illustrating the invention, it is to be understood that various changes and modifications can be made without departing from the scope of the invention, which is defined by the appended claims.

METHOD OF OPERATION

As used herein, the term "test instrument" means an object having dimensions that are to be determined by the comparator. A test instrument may be, for example, a cylinder, a ring, a threaded cylinder (bolt), or a threaded ring (nut).

The term "standard" means an object that is scanned before the test instrument is scanned to provide a basis for comparison. The dimensions of the standard are known and are preferably of a higher degree of accuracy than the dimensions of the test instrument. The standard is chosen to have dimensions that are as close as possible to the dimensions of the test instrument to be scanned by the comparator.

For example, if the test instrument has a known nominal diameter of 0.5 inches, then one would choose a standard having a nominal diameter as close as possible to 0.5 inches. The nominal diameter of the standard must be within plus or minus 0.1 inch of the nominal diameter of the test instrument because of the range of the comparator in the Y-axis direction.

As shown in FIGS. 1 and 2, a comparator 10 includes left and right spindles 12, 14 for holding the standard or test instrument 32 in an X-axis direction, a stylus arm 18 for contacting the test instrument in a Y-axis direction during scanning and a computer 50 for controlling the comparator 10. The comparator 10 further comprises an X-axis motor 26 for moving the stylus arm 18 in the X-axis direction relative to the standard or test instrument and an X-axis motor controller 60 connected to the X-axis motor 26 and the computer 50. A Y-axis motor 27 moves the stylus arm 18 in the Y-axis direction and a Y-axis motor controller 62 is connected to the Y-axis motor 27 and the computer 50. A Z-axis motor 34 moves the standard or test instrument in a Z-axis direction and a Z-axis motor controller 64 is connected to the Z-axis motor 34 and the computer 50.

As shown in FIG. 5A, the comparator 10 further comprises X, Y and Z-axis sensors 38, 39, 36 connected to the computer 50. The X-axis sensor 38 senses a position of the stylus arm 18 in the X-axis direction, the Y-axis sensor 39 senses a position of the stylus arm 18 in the Y-axis direction and the Z-axis sensor 36 senses a position of the standard or test instrument in the Z-axis direction.

The method of operating the comparator 10 to determine dimensions of a test instrument includes selecting a standard having a known diameter similar to a nominal diameter of the test instrument. Known properties of the test instrument, for example, nominal diameter, plane or threaded surface and internal or external threads, are input into the computer 50. The standard is mounted in the comparator 10 and scanned to thereby associate the known diameter of the standard with a Y-axis position of the stylus arm 18. The standard is removed from the comparator 10 and the test instrument is mounted in the comparator. The test instrument is then scanned. The standard scan data is compared to the test instrument scan data to determine the test instrument dimensions.

The standard scan data is compared to the test instrument scan data by subtracting the standard scan data from the test instrument scan data to obtain differential data and then adding the known diameter of the standard to the differential data to obtain the test instrument dimensions.

Based on the test instrument dimensions, the computer 50 can calculate major diameter, minor diameter, flank angle, pitch diameter, lead, root width, root radii, taper, roundness, helical path, runout and crest width.

The method of operation of the comparator 10 further includes controlling the X, Y and Z-axis motor controllers 60, 62, 64 with the computer 50 and sending position data from the X, Y and Z-axis sensors 38, 39, 36 to the computer. If it is desired to scan the test instrument at more than one location on its perimeter, the test instrument is rotated in the Z-axis direction. The Z-axis motor 34 rotates the test instrument under control of the Z-axis motor controller 64 by command from the computer 50. When the test instrument is at the desired Z-axis position, the rotation is stopped and the test instrument is scanned again.

A brief functional description of the comparator software follows. More details may be found in the Computer Program Listing Appendix, which includes the control software for the comparator.

1.0 Input
Real cal=0; Simulated modes=1; Statistical tools=2
1.1 Input=0
1.1.1 Want to input data sheet information y/n?
1.1.1.1 Standard inputs for test instrument identification
1.2 Input=1
1.2.1 Simulate system instruments y/n?
1.2.2 Disarm error branching routines
1.2.3 Simulate admin inputs
1.2.4 Simulate data sheet
1.3 Input=2
1.3.1 Access curve fit program yin?
1.3.2 Access "sigma/ci/average" programs.
2.0 Setup Initialization
Initializes key variables to a "get started" default condition.
3.0 System Zero
3.1.1 Auto directs the installation of a reference standard which sets the "Y & X" axis zeros for all subsequent configurations.
3.1.2 Manual version of 3.1.1.
4.0 X Scan
Automatically scans the reference standard several times to 'warm up' the instrument.
5.0 Main Menu (To $Sub_{13}$ routine)
5.1 New Series=1 (TO Test_setup)
Entering a one advances the program to the most fundamental 'test setup procedural code' wherein the operator inputs the test instrument (TI) shape (i.e. threads or plain), the gender (external or internal), pitch, type of system coupling, etc. (more in 'test_setup')
5.2 Rerun Same Series=2 (TO Test_setup)
Entering a two is a 'short cut' version of the above 'new series' where only the diameter or pitch is assumed to have changed.
5.3 Print Raw Data=3 (To Raw_Data)
Does a printout of an entire x, y and angle raw and corrected data scan plus other key parameters needed in trouble shooting.
5.4 System Cal=4 (To System_Cal)
Conducts the calibration process of the thread gage calibrator y axis wherein the y sensor output is validated for the actual stylus tip motion.
5.5 Store parameters=5 (to Sys_Data_Stor)
Stores on diskette media the system calibration and other operating parameters.
5.6 Stepless rerun of TI or Cal=6
Entering a 'six' reruns the TI or system calibration routines without the need to rescan the standard.
5.7 Report of test=7 (To Report)
Prints a report of test on the system printer and on the computer monitor.
5.8 Shutdown
Stops the scanning motors immediately and then attempts to recover raw data taken to the point of invocation.
5.9 Save cal=9 (To Last_test)
Saves raw system calibration data not yet converted to final form.
5.10 Step axis motors (To Step_adj)
Initiates the stepping motion of the x, y and z axis by pressing a control key per each step.
6.0 Setup_init (see paragraph 2.0)
7.0 Testsetup
7.1 test cal mode=0 diagnostics=1
7.1.1 mode=0 Program bypasses diagnostic routines.
7.1.2 mode=1 Program gives operator a choice of a 'curve fitting program' or a 'bell curve' analysis (sigma/ci/aver/etc).
7.2 Objective? TI cal=1 r&d cal=2 system cal=4
7.2.1 TI cal=1
Test continues toward routine calibration objectives.
7.2.2 r & d cal=2
This input enables more specific and versatile prompting that allows more statistical feed back to be acquired about the gages (not the TI's) performance.
7.2.3 system cal=4
This entry moves the program to a test setup sequence that enables the calibration of the thread gage itself.
7.3 series ?(helix=1; plainplugs/rings=2; gears=3)
7.3.1 helix=1
CRT communication, 'ready to test' inputs to critical parameters, motion control dynamics, temperature and stylus friction load control parameters, stylus zero positioning, applicable real time analysis routines, final data reduction and presentation routines are enabled.
7.3.2 plain plug=2
Same as 7.3.1 except as pertains to plain cylinders.
7.3.3 gears=3
Same as above except as pertains to gears.
7.4 coupling ? (centers=1; vee block=2; ring pin=3)
7.4.1 centers=1
Directs prompts and motion instructions necessary to interface and stabilize the probe engagement with the system centers couplers.
7.4.2 vee block=2
Same as 7.4.1 except as pertains to vee block coupling.
7.4.3 ring pin coupling
Same as 7.4.1 except as pertains to ring calibration.
7.5 user units (inch=1; mtr=2; dm=3; cm=4; mm=5)
7.5.1 inch=1
Selects the inputs for the display variables, the raw data correction factors, etc. for the total process family of units (including angle units compatible in size) associated with measurement in inches.
7.5.2 thru 7.5.6 (i.e mtr=2, dm=3, etc. Is objective identical to 7.5.1?)
7.6 surface (external=1 internal=2)
7.6.1 external=1
Selects the gender of the series (i.e. external surface of the artifact under test) such that the program can communicate compatible instructions.
7.6.2 internal=2
As in 7.6.1, except for internal (ring) artifacts under test.
7.7 y carriage
Instructs the proper y stage height to the operator, referenced per the y axis staging scale, relative to the TI series & diameter, such that optimum stylus motion is available.
7.8 draw_setup
Enables CRT communication by drawings of the constituted test setup—so far.

7.9 nominal major diameter?
Operator inputs the TI nominal major diameter which is the single most important calibration program control parameter.

7.10 grade (w=1; x=2; xx=3; unc[1a=4, 2a=5, 3a=6], unf [1a=7, 2a=8, 3a=9])

7.10.1 w=1
This is the top grade TI, which therefore necessitates optimal system procedure in terms of stability control and motion performance. Consequently, external and internal temperature stability criteria will be given the tightest tolerances and data density will be optimized also via scanning speed control.

7.10.2 thru 7.10.9
Same objectives as 7.10.1 but for the applicable grade of TI. As lower grades are selected, the trade off between certainty and cost reduction shifts toward cost reduction.

7.11 system accuracy ? (30 u_in=1; 60 u_in=2; 100 u_in=3)

7.11.1 30u_in=1
The system timing and motion control parameters are made optimal for low uncertainty regardless of the TI grade selected.

7.11.2–7.11.3 60_in and 100u_in
As above with trade-off of certainty for cost as the accuracy requirement declines.

7.12 type? (non gage=0; go=1; nogo=2)

7.12.1 go=1
This input enables 'nominal major diameter' inputs to be converted into the 'go' plug or ring diameter. Go and nogo gages are sized at the allowable 'high and low' tolerances for normal gages.

7.12.2 nogo=2
Same as 7.12.1 as pertains to the 'nogo' type.

7.13 range/magnitude
This is the most powerful TI characterization parameter and therefore the most useful in constructing and guiding the calibration strategies herein. Basically all the dynamics and the analysis are 'keyed' from this entry.

7.14 resolution/interval
This input is the TI resolution in figures to the right of the decimal. Among other uses, this figure sets a practical limit on the uncertainty required of the gageing system. Both range and resolution are inputted for all control variables (i.e. x axis, y axis, z axis) of the process. On an axis by axis basis, the inputs are compared with the already compiled body of TI characterizing information for inconsistencies. If any are found, a flag is raised and the operator must re-input or bypass the inconsistency.

7.15 gosub temp_input
This code either automatically reads a bus configured temperature sensor or asks for an operator input of the environmental temperature. This input is used to correct all measurements relative to 68 degrees F.

7.16 i.d of employed standards
This series of inputs satisfies the legal calibration requirement of 'traceability' of accuracy .

7.17 printer ? (y/n)
An input of (y) would enable the system printer 8.0 gosub s0_init
An abbreviated version of 'setup_init' (see paragraphs 6.0 & 2.0) to reconfigure and initialize the system for a 'rerun' or a 'new' TI of the same series but possibly different diameter or pitch.

9.0 gosub s1_init
This routine is an initialization of all angle (z axis) parameters.

10.0 gosub s1_reduce
All subroutines named with a 'reduce' attachment solve variables that are a function of their applicable axis. In this case, that would be the z (perimeter) axis. Another function is to reduce variables involving many characters to a shorter form to save memory, line space and to speed up program execution.

11.0 gosub conf_s1
This routine physically and parametrically configures the z axis for calibration. It does so as follows:

11.1 Using the y axis motor, the stylus retracts so that the TI or standard can be installed.

11.2 The spindle is rotated, using the z axis motor to the applicable perimeter.

11.3 The stylus is automatically re-engaged using the y axis motor.

12.0 gosub s2_init
Same as s1_init except as pertains to the 'cardinal' x (i.e thread count) axis.

13.0 gosub s2_reduce
Same as s1_reduce (paragraph 10.0) except as pertains to the cardinal x axis.

14.0 gosub conf_s2
Used only for communication of test flow in terms of 'thread count'.

15.0 gosub s3_init
An initialization of all parameters associated with beginning a new scan of the x axis.

16.0 s3_reduce
Same as paragraph 10.0 except as applies to variables that are a function of the x axis. In addition, this routine starts the counter of output data from the x, y and z sensors, whose output rate make up the pacing clock of the data gathering process. The test cannot proceed any faster than the necessary resolution requirements—which, in turn, are paced by the sensor(s) sample rate.

17.0 conf-s3
Not used 18.0 s4$_{13}$ init
Initializes 'flags' which 'lock out' certain sequences of thread profile analysis while opening the applicable one.

19.0 s4_reduce
This routine reduces variable size based upon whether the test phase was in the process of zeroing the standard or measuring the step between the standard and the TI. Also, this routine controls the number of threads tested should they be different for the standard versus the TI.

20.0 conf_s4
Directs the installation, for the subsequent scan, of the calibration standard followed by almost identical preparation for the TI scan. These preps include:

20.1 Positioning the system stages at the axis zeros.

20.2 Lifting the stylus out of the T1 or standard 'insertion' path.

20.3 Engaging the stylus in a data gathering encounter such that the 'pre-scan' stability can be measured.

20.4 Advancing to the actual scan stabilizing code when/if stability or time limit is achieved.

21.0 gosub sS_init
Reaffirmation of the 'motion control' & 'talk initiating' axis initialization(s).

22.0 gossip s5_reduce
Similar to the class of 'reduce' subroutines except as applies to the 'motion control & 'talk initiating' axis.

23.0 gosub conf_s5

Sets the x axis motor scan parameters and 'calls for' (i.e. initiates through another subroutine) a constant speed (open loop) scan of the specimen profile. This motion drags the stylus across the multi-thread (x) axis of a thread specimen.
24.0 gosub s6_init
Objectively identical to all preceding 'init' tagged subroutines except as pertains to the 'sensor feedback' axis. X, Y, and temperature.
24.1 gosub s6_reduce
Objectively identical to all preceding 'reduce' tagged subroutines.
25.0 gosub conf_s6
Not used.
26.0 gosub s6_listen Normal program flow goes from axis initializations, followed by variable size reductions and conversions, then followed by axis configurations. This completes the input phase for the given axis and the program is now ready for the system response phase. 'S6_listen' is the first such phase followed by s5_listen, s4_listen, etc. In particular, this routine provides another 'emergency shutdown' branching routine in case of a raw data unexpected input. In general, however, this routine is a search of the various media based and accompanying source coded sensor routines that have been enabled at the test setup.

The standard equipment based sensors are the Heidenhain VRZ720 hybrid interferometer sensors (for all three displacement axis) and the Hewlett Packard IN4202 instrument scanner used to input temperature from platinum resistance thermometers. Finally this routine sorts the Heidenhain outputs and then converts them to x,y and z format for convenient program language, maintenance and speed.
27.0 gosub s6_analysis
This subroutine takes the sensor output information, acquired under the motion dynamics imposed in the configuration routines, and converts it into a measurement as follows:

First the system establishes a physical zero applicable to the method of coupling (i.e. coupling the specimen to the system) used. This involves first scanning a specimen of known diameter (i.e. a standard). Then, by the method of 'curve fitting' put this data in polynomial form as a function of the x axis position. The actual sensors can be, but need not be, zeroed by pressing the VRZ [ref] button prior to the aforementioned scan.

Each new incoming reading, thereafter, is converted to a step in x, y and z by subtracting the zero scan polynomial value. The steps are then 'scaled' by a factor, such as, in the case of the y step, by k. The instantaneous value of k was originally downloaded from the media data base but resides in RAM during the test as a participant in a polynomial function which converts 'sensor displacement' output to actual stylus y axis displacement. The k value represents the type of coupler used, the instantaneous position along the x axis and the 'raw' magnitude of the displacement itself.

The corrected y step is now joined to the previously inputted diameter of the reference standard to complete the measurement. There is additional tasking for this subroutine in the event that v block coupling has been selected. In this case, the system must apply both scale factors. Those that apply to 'center' coupling and scale factors that apply to v block coupling under the initial conditions of stylus engagement.

It is not known where the specimen is located in terms of the y axis, in part, because in v blocks, specimens of different diameters contact the v block at different elevations. Since the thread flanks are supported by the outer diameter and therefore act as under 'centers,' the system must determine where the major diameter is in the v block in order to apply the appropriate scale factors. This can only be done, at a minimum, after the scan of one thread and must improve thereafter. Thus, the data from the first thread scanned cannot be used in the final report.

Next this routine calls an instantaneous 'flank' angle determining routine to be used as a system speed control parameter—among other reasons. Finally, this routine uses the angle, x and y measurements to 'lock in' and 'lock out' feature thread profile defining code, which when determined, sets the appropriate profile scan speed.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of operating a comparator to determine dimensions of a test instrument, the comparator comprising left and right spindles for holding the test instrument in an X-axis direction; a stylus arm for contacting the test instrument in a Y-axis direction during scanning and a computer for controlling the comparator; an X-axis motor for moving the stylus arm in the X-axis direction and an X-axis motor controller connected to the X-axis motor and the computer, a Y-axis motor for moving the stylus arm in the Y-axis direction and a Y-axis motor controller connected to the Y-axis motor and the computer, and a Z-axis motor for moving the test instrument in a Z-axis direction and a Z-axis motor controller connected to the Z-axis motor and the computer, the method comprising:

selecting a standard having a known diameter similar to a nominal diameter of the test instrument;

inputting known properties of the test instrument into the computer;

controlling the X, Y and Z-axis motor controllers with the computer;

mounting the standard in the comparator;

scanning the standard to thereby associate the known diameter of the standard with a Y-axis position of the stylus arm;

removing the standard from the comparator;

mounting the test instrument in the comparator;

scanning the test instrument; and comparing standard scan data to test instrument scan data to determine test instrument dimensions.

2. The method of claim 1 wherein the comparing step comprises subtracting the standard scan data from the test instrument scan data to obtain differential data and then adding the known diameter of the standard to the differential data to obtain the test instrument dimensions.

3. The method of claim 1 wherein the test instrument dimensions comprise at least one of major diameter, minor diameter, flank angle, pitch diameter, lead, root width, root radii, taper, roundness, helical path, runout and crest width.

4. The method of claim 1 wherein the known diameter of the standard is within plus or minus 0.1 inch of the nominal diameter of the test instrument.

5. The method of claim 1 wherein the known properties of the test instrument comprise at least one of nominal diameter, plane or threaded surface and internal or external threads.

6. The method of claim 1 wherein the comparator further comprises X, Y and Z-axis sensors connected to the computer, the X-axis sensor for sensing a position of the stylus arm in the X-axis direction, the Y-axis sensor for sensing a position of the stylus arm in the Y-axis direction, the Z-axis sensor for sensing a position of the test instrument in the Z-axis direction, the method further comprising sending position data from the X, Y and Z-axis sensors to the computer.

7. The method of claim 6 further comprising rotating the test instrument in the Z-axis direction, the rotating being performed by the Z-axis motor under control of the Z-axis motor controller by command from the computer, stopping rotation of the test instrument, and then, scanning the test instrument again.

8. An automated contact gage system for gaging a device, comprising:

left spindle means for contacting the device from a first direction;

right spindle means for contacting the device from a second direction;

stylus arm means for contacting the device from a third direction; and, bearing means contacting said stylus arm means comprising five spherical race elements contacting two bearing elements.

9. A bearing arrangement for use in a contact measurement system to guide and support a stylus arm of the contact measurement system, said bearing arrangement comprising:

a spherical race comprising five spherical elements; and, two bearings in contact with the five spherical elements.

10. The bearing arrangement of claim 9, wherein the five spherical elements are arranged to contact one another in two rows comprising two spherical elements and three spherical elements respectively.

11. The bearing arrangement of claim 10, wherein the two bearings each contact three of five spherical elements.

12. The bearing arrangement of claim 11, wherein the five spherical elements comprise precision balls.

13. An automated contact gage system for gaging a device, comprising:

left spindle means for contacting the device from a first direction;

right spindle means for contacting the device from a second direction;

stylus arm means for contacting the device from a third direction; and, bearing means contacting said stylus arm means wherein the bearing means propel the stylus arm means along the device in the third direction, allowing substantially no side to side movement of the stylus arm means.

14. The system of claim 13, wherein the bearing means comprises five spherical elements and two bearings.

15. The system of claim 13, wherein the device being gaged comprises a ring, the system further comprising ring adapter means mounted on the right spindle means for holding the ring.

16. The system of claim 13, further comprising first sensor means operatively associated with the stylus arm means for sensing movement of the stylus arm means with respect to a first axis.

17. The system of claim 16, further comprising second sensor means operatively associated with the stylus arm means for sensing movement of the stylus arm means with respect to a second axis.

18. The system of claim 17, further comprising third sensor means operatively associated with the right spindle means for sensing rotational movement of the device.

19. The system of claim 18, further comprising a Z motor disposed between the third sensor means and the right spindle means for driving the right spindle means to obtain the rotational movement.

20. The system of claim 13, further comprising first sensor means operatively associated with the right spindle means for sensing rotational movement of the device.

21. The system of claim 20, further comprising a Z motor disposed between the first sensor means and the right spindle means for driving the right spindle means to obtain the rotational movement.

22. The system of claim 21, further comprising second sensor means operatively associated with the stylus arm means for sensing movement of the stylus arm means with respect to an axis.

23. The system of claim 13, further comprising a Z motor connected to the left or right spindle means wherein the Z motor may rotate the left of right spindle means, which rotates the device to provide a new surface for contact by the stylus arm means.

24. The system of claim 23, further comprising means for sensing rotational movement of the device provided by the Z motor.

* * * * *